United States Patent [19]

Schweizer et al.

[11] Patent Number: 5,023,002
[45] Date of Patent: Jun. 11, 1991

[54] METHOD AND APPARATUS FOR RECOVERING OIL FROM AN OIL SPILL ON THE SURFACE OF A BODY OF WATER

[75] Inventors: Richard W. Schweizer, Sugar Land; Kantilal P. Patel; Philip Y. Lau, both of Houston, Tex.

[73] Assignee: ACS Industries, Inc., Woonsocket, R.I.

[21] Appl. No.: 506,705

[22] Filed: Apr. 9, 1990

[51] Int. Cl.$^5$ .................... E02B 15/04; B01D 17/02
[52] U.S. Cl. ................................ 210/710; 210/712; 210/749; 210/799; 210/196; 210/201; 210/205; 210/257.1; 210/DIG. 5; 210/923
[58] Field of Search ............... 210/708, 710, 712, 749, 210/776, 799, 805, 196, 201, 205, 242.3, 257.1, 253, 259, DIG. 5, 923

[56] References Cited

U.S. PATENT DOCUMENTS

| | | | |
|---|---|---|---|
| 3,536,616 | 10/1970 | Kondoh | 210/924 |
| 3,925,202 | 12/1975 | Hirs | 210/795 |
| 3,966,614 | 6/1976 | Ayers | 210/242.3 |
| 4,168,229 | 9/1979 | Chambers | 210/799 |
| 4,512,901 | 4/1985 | Kozar | 210/799 |
| 4,526,514 | 7/1985 | Duverne | 210/923 |
| 4,824,555 | 4/1989 | Paspek et al. | 210/708 |

Primary Examiner—Stanley Silverman
Assistant Examiner—Christopher Upton
Attorney, Agent, or Firm—Salter & Michaelson

[57] ABSTRACT

A method and apparatus for recovering oil from an oil spill on the surface of a body of water. The method is operative for recovering an oil having a viscosity in excess of 80 centipoise and it includes the steps of drawing an oil-water mixture from the surface of a body of water, adjusting the viscosity of the oil in the oil-water mixture to a level below approximately 80 centipoise and passing the resultant adjusted oil-water mixture through an oil-water coalescer to separate the oil in the adjusted oil-water mixture from the water therein. The viscosity of the oil in the feed oil-water mixture is preferably adjusted by adding a low viscosity hydrophobic hydrocarbon solvent to the oil-water mixture.

The apparatus includes a skimmer for withdrawing feed oil-water mixture from the surface of a body of water, a solvent system for adding solvent to the oil in the feed oil-water mixture to reduce the viscosity of the oil in the feed oil-water mixture to below approximately 80 centipoise and an oil-water coalescer for separating the solvent and oil in the viscosity adjusted feed oil-water mixture to below approximately 80 centipoise.

19 Claims, 1 Drawing Sheet

METHOD AND APPARATUS FOR RECOVERING OIL FROM AN OIL SPILL ON THE SURFACE OF A BODY OF WATER

BACKGROUND AND SUMMARY OF THE INVENTION

The instant invention relates to a method and apparatus for recovering oil, such as contained in a high viscosity crude oil residue, from an oil spill on the surface of a body of water, wherein virtually all of the water initially recovered with the oil is separated therefrom and returned to the body of water.

It is widely recognized that oil spills represent a major threat to the ecological systems associated with many bodies of water, including bays, rivers, coastal areas and areas of open water. For example, it is well documented that an oil spill such as the one which occurred in Prince William Sound off the coast of Alaska in March of 1989 can cause immeasurable damage to coastal areas as well as immeasurable damage to many forms of marine wildlife. Nevertheless, because of the critical importance of petroleum products to virtually all industrialized economies, it is also widely recognized that it is simply not possible to eliminate the practice of transporting crude oils and refined petroleum products on many navigable waterways. Further, it is recognized that while precautionary measures can be taken to reduce the frequency of oil spills on navigable waterways it is virtually impossible to eliminate all oil spills.

Although virtually all oil spills are potentially damaging to the environment, it has generally been found that the most serious oil spills are those in which crude oils or heavy residual oils are spilled onto the surfaces of bodies of water rather than spills involving lighter refined products, such as gasoline, kerosene, or No. 2 fuel. This is because lighter refined products tend to have somewhat higher solubilities in water and they also tend to dissipate relatively quickly through evaporation. Light refined products have also generally been found to be less damaging to shore areas and wildlife than other types of oil. On the other hand, oil spills involving crude oils or heavy residual oils, such as No. 6 fuel, tend to be extremely damaging to coastal areas and marine wildlife. Further, the highly viscous heavy residual fractions of oils of this type, particularly crude oils, tend to rapidly concentrate as the lighter fractions thereof dissipate, making their impact on the environment even more severe.

It has been found that one of the main reasons that damage to the environment from oil spills is so extremely high is the general ineffectiveness of the previously known processes and apparatus for rapidly recovering oils from the surfaces of bodies of water. In this connection, most of the previously known apparatus for recovering oil from the surfaces of bodies of water have comprised skimmer boats which are operative in combination with floating booms for skimming the surfaces of bodies of water to recover oil therefrom. However, because the previously known skimmer boats have often picked up as much as 100 gallons of water for every one gallon of oil recovered, they have been found to be impractical and incapable of rapidly recovering large quantities of oil from the surfaces of bodies of water. Specifically, this is because the previously available skimmer boats have generally been incapable of separating oil from water recovered therewith and as a result, they have required extremely large on board storage capacities to recover relatively small quantities of oil. Further, while skimmer boats which are capable of recovering oil without excessive quantities of water utilizing rotating discs have also been previously available, these boats have been incapable of effectively recovering lighter oils and they have generally been ineffective in other than perfectly calm sea conditions. Hence the previously available skimmer boats have generally been incapable of rapidly recovering large quantities of oil from the surfaces of bodies of water. Still further, while various types of absorbent materials have also been heretofore available for use in recovering oils from the surfaces of bodies of water, it has been found that such materials have generally only been capable of recovering small quantities of oil and hence they have been found to be impractical for use in connection with relatively large oil spills such.

While oil-water coalescers have often been found to be effective for separating oil from water in various on-shore processing operations in oil refineries, petrochemical plants, and the like, the use of such coalescers has generally been limited to processing oil-water streams containing relatively light oils having viscosities of less than approximately 80 centipoise. This is because the rate at which separation between the oil and water phases of an oil-water stream can be effected in an oil-water coalescer is directly related to the viscosity of the oil in the oil-water stream through Stoke's Law. In this regard, as is well known to those skilled in the art relating to oil-water coalescers, the rate at which separation can be effected is directly related to the terminal velocities of the immiscible water droplets in the oil phase. The terminal velocities of the water droplets are determined by Stoke's Law in accordance with the following:

$$V = \frac{0.001286(G_w - G_o)D^2}{\mu}$$

where $V$ = Terminal velocity of water droplets
   = in inches/minute $G_w$ = Specific gravity of water $G_o$ = Specific gravity of oil $D$ = Water droplet size in microns $\mu$ = Viscosity of oil in centipoise Through experimentation it has been determined that in most cases Stoke's Law effectively limits the practical use of oil-water coalescers to processing oil-water streams having viscosities of less than approximately 80 centipoise. As a result, heretofore it has generally not been considered to be possible to process oil-water mixtures containing oils having viscosities of greater than approximately 80 centipoise through oil-water coalescers. Since the oils recovered from most oil spills involving crude oils or residual oils have viscosities well in excess of 80 centipoise, it has generally not been considered to be possible to utilize oil-water coalescers to process the oils recovered from most crude oil spills. Further, since the heretofore available oil-water coalescer apparatus have not been capable of processing the oils recovered from most crude oil spills, the use of oil-water coalescers in any type of oil spill recovering apparatus has previously not been considered to be practical.

The instant invention represents a significant advancement in the technology relating to oil spill recovery processes and apparatus by providing an effective method and apparatus for rapidly recovering a relatively large volume of oil from an oil spill on the surface of a body of water. More specifically, the instant invention provides a method and apparatus for recovering oil from the surface of a body of water by skimming the surface of the body of water to recover a feed oil-water mixture therefrom, separating the oil in the feed oil-water mixture from the water therein and then returning the separated water to the body of water so that the oil can be practically stored on board a recovery boat, such as a skimmer boat, a barge or any other floating container. Still more specifically, the instant invention provides a method and apparatus which are operative for processing a feed oil-water mixture through an oil-water coalescer to separate the oil in the feed oil-water mixture from the water therein regardless of the viscosity of the oil. Accordingly, when the method and apparatus of the instant invention are utilized on board a navigable boat, such as a skimmer boat, the oil recovered from an oil-water mixture can be immediately separated from the water recovered therewith so that the oil can be stored on the boat without also storing an excessive quantity of water. Hence, the method and apparatus of the instant invention can effectively increase the storage capacity of a skimmer boat by a factor of up to 50 times or more making it possible and practical to rapidly recover a relatively large quantity of oil from the surface of a body of water utilizing a skimmer boat or the like. The method of the instant invention in its broadest form is operative for recovering an oil having a viscosity of greater then approximately 80 centipoise from the surface of a body of water by continuously withdrawing a feed oil-water mixture from the surface of the body of water, continuously adjusting the viscosity of the oil in the feed oil-water mixture to a level below approximately 80 centipoise to form an adjusted oil-water mixture and continuously passing the adjusted oil-water mixture through an oil-water coalescer. However, in the preferred form of the method of the instant invention the viscosity of the oil in the feed oil-water mixture is adjusted by adding a petroleum distillate solvent thereto, such as kerosene or No. 2 fuel oil, in order to reduce the viscosity of the oil in the feed oil-water mixture to a level below approximately 80 centipoise. The method is preferably carried out on board a boat, such as a skimmer boat, which is navigable on a body of water having an oil spill thereon and the water from the oil-water coalescer is preferably returned directly to the body of water, whereas the oil is preferably stored on board the boat. In the preferred form of the method, solvent is added to the feed oil-water mixture at a rate which is substantially greater than that required to reduce the viscosity of the oil in the feed oil-water mixture to a level below approximately 80 centipoise and the oil-solvent mixture from the coalescer is stored in a recycled vessel and then added to the feed oil-water mixture to reduce the viscosity of the oil in the feed oil-water mixture to a level below approximately 80 centipoise. A quantity of oil-solvent mixture equal to approximately 30% of the volume of the feed oil-water mixture during a one (1) minute interval is preferably accumulated in the recycle vessel before the oil-solvent mixture is used to reduce the viscosity of the oil in the oil in the feed oil-water mixture in order to provide a sufficient quantity of oil-solvent mixture and a sufficient residence time of the oil-solvent mixture in the recycle vessel to make it practical to control the viscosity of the feed oil-water mixture with the oil-solvent mixture. In any event, the oil-solvent stream from the recycle vessel is continuously recycled to the feed oil-water mixture for a period of time which is less than the period of time required to raise the viscosity of the oil-solvent mixture in the recycle vessel to a level above approximately 80 centipoise.

The apparatus of the instant invention which is operative for carrying out the method comprises means for withdrawing a feed oil-water mixture from the surface of a body of water, means for adjusting the viscosity of the oil in the feed oil-water mixture to a level of below approximately 80 centipoise to form an adjusted oil-water mixture and an oil-water coalescer for separating the oil in the adjusted oil-water mixture from the water therein. The means for adjusting the viscosity of the oil in the feed oil-water mixture preferably comprises means for adding a hydrophobic hydrocarbon solvent to the feed oil-water mixture, the solvent having a viscosity of less than approximately 80 centipoise and being added at a rate sufficient to reduce the viscosity of the oil in the feed oil-water mixture to a level below approximately 80 centipoise. The means for adding solvent is preferably operative for adding solvent at a rate which is in excess of the rate required to reduce the viscosity of the oil in the feed oil-water mixture to below approximately 80 centipoise and the apparatus preferably further comprises a recycle tank for receiving the oil-solvent mixture from the coalescer and means for recycling the oil-solvent mixture from the recycle tank into the feed oil-water mixture in order to reduce the viscosity of the feed oil-water mixture to a level below approximately 80 centipoise. The apparatus is preferably mounted on a boat such as a skimmer boat, a barge or any other floating container which is navigable on the surface of a body of water and the coalescer preferably includes an inlet first stage, an oil second stage and a water second stage, wherein the inlet first stage is operative for producing a two phase oil-water intermediate stream, the oil second stage is operative for receiving and further purifying the oil phase of the intermediate stream and the water second stage is operative for receiving and further purifying the water phase of the intermediate stream.

Apparatus and methods representing the closest prior art to the subject invention of which the applicant is aware are disclosed in the U.S. Pat. Nos. to Kondoh et al 3,536,616; Hirs No. 3,925,202; Chambers No. 4,168,229; and Duverne No. 4,526,514, however, while the apparatus and methods disclosed in these references are generally related to oil-water recovery and separation apparatus they fail to suggest the concept of adjusting the viscosity of the oil in an oil-water mixture recovered from an oil spill and then passing the adjusted oil-water mixture through an oil-water coalescer and hence, they are believed to be of only general interest with respect to the subject invention.

It has been found that the method and apparatus of the instant invention can be effectively utilized on board a boat, such as a skimmer boat, for separating the oil recovered from an oil spill from the water recovered with the oil so that the oil can be more effectively stored on board the boat. In this connection, it has been found that by reducing the viscosity of the oil in a feed oil-water mixture from an oil spill, the feed oil-water mixture can be effectively processed in an oil-water coalescer regardless of the original viscosity of the oil from the oil spill. In the preferred method and apparatus the viscosity of the oil in the feed oil-water mixture is reduced by adding a solvent to the feed oil-water mixture. This actually has the effect of an oil spill. However, despite the fact that the addition of a solvent increases the volume of the oil and solvent mixture recovered from the coalescer, the volume of the oil and solvent mixture is normally substantially less than the volume of the feed oil-water mixture drawn from an oil spill. Hence, despite the fact that the volume of the solvent has the effect of reducing the storage capacity for storing oil from an oil spill on board a skimmer boat the net effect of the solvent is to substantially increase the overall storage capacity of the skimmer boat by making it unnecessary to store water drawn from a crude oil spill along with the oil recovered therefrom.

As a result of the above, it is a primary object of the instant invention to provide an effective method for recovering oil from an oil spill on the surface of a body of water.

Another object of the instant invention is to provide an effective method of recovering oil from a surface of a body of water wherein water recovered with the oil is returned to the body of water.

An even further object of the instant invention is to provide an effective method and apparatus for separating a relatively high viscosity oil in an oil-water mixture recovered from the surface of a body of water from the water in the oil-water mixture so that the oil can be effectively stored on an oil recovery boat navigating on the surface of the body of the water.

Other objects, features and advantages of the invention shall become apparent as the description thereof proceeds when considered in connection with the accompanying illustrative drawing.

DESCRIPTION OF THE DRAWING

In the drawing which illustrates the best mode presently contemplated for carrying out the present invention.

DESCRIPTION OF THE INVENTION

Figure 1:
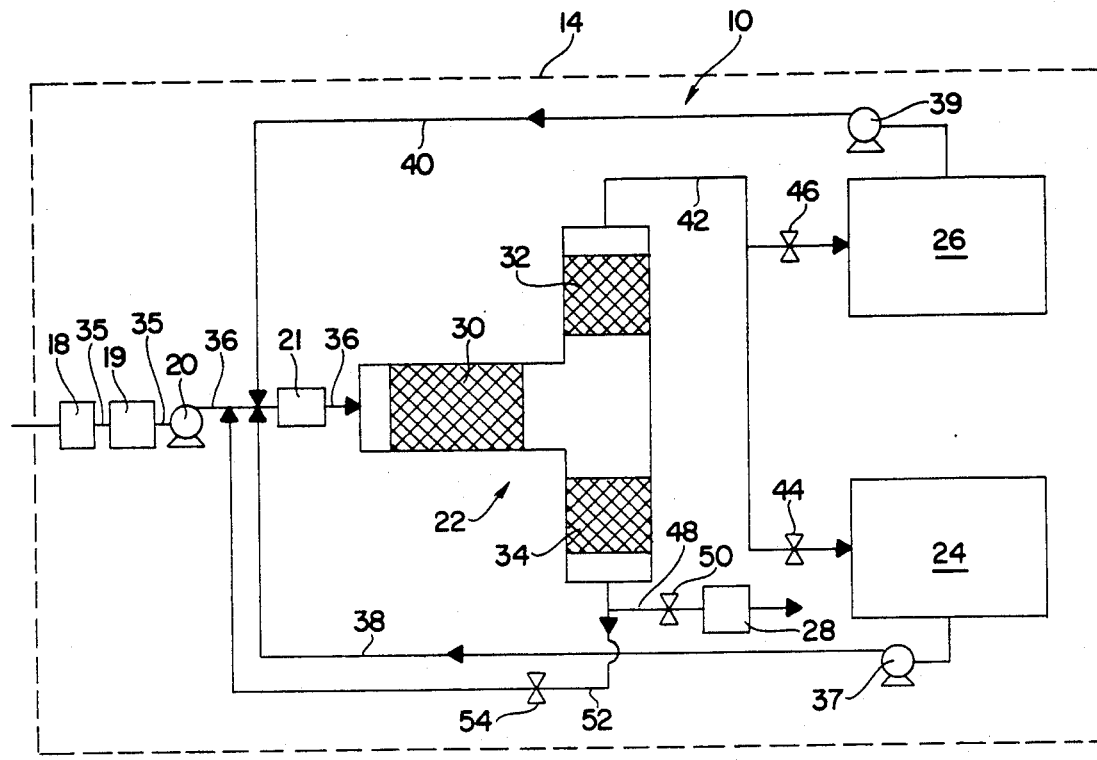
FIG. 1 is a schematic view of a first embodiment of the apparatus of the instant invention.
Figure 2:
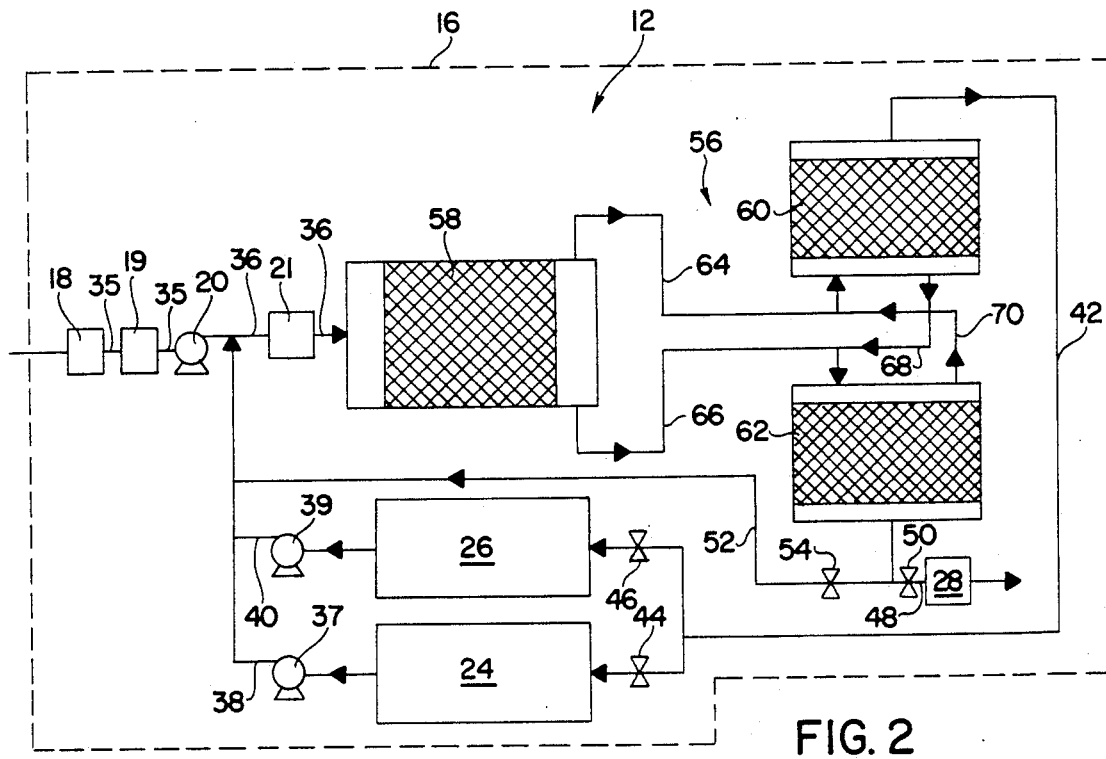
FIG. 2 is a schematic view of a second embodiment thereof.

Referring now to the drawing, a first embodiment of the apparatus of the instant invention is illustrated in FIG. 1 and generally indicated at 10 and a second embodiment of the apparatus of the instant invention is illustrated in FIG. 2 and generally indicated at 12. The apparatus 10 and 12 are adapted to be mounted on board oil recovery boats schematically illustrated at 14 and 16, respectively, for recovering oil-water mixtures from oil spills on the surfaces of bodies of water in accordance with the method of the instant invention. The apparatus 10 and 12 are operative for processing feed oil-water mixtures recovered from the surfaces of bodies of water in order to separate the oils in the feed-oil mixtures from the water therein so that the oils can be more effectively stored on board the boats 14 and 16.

Referring to FIG. 1, the apparatus 10 comprises an inlet skimmer 18, an inlet filter 19, an inlet pump 20, a mixer 21, a coalescer assembly generally indicated at 22, a solvent storage tank 24, a recovered oil storage tank 26 and a hydrocarbon sensor 28. The coalescer assembly 22 includes an inlet first stage section 30, an oil second stage section 32 and a water second stage section 34. The skimmer 18 is connected to the inlet filter 19 through an inlet line 35 which also connects the filter 19 to the feed pump 20 and a feed line 36 connects the feed pump 20 to the mixer 21 and the mixer 21 to the coalescer assembly 22. The solvent tank 24 is connected to the feed line 36 between the pump 20 and the mixer 21 through a pump 37 and a solvent line 38, and the recovered oil storage tank 26 is connected to the feed inlet line 36 between the pump 20 and the mixer 21 through a pump 39 and a recycle line 40. The oil second stage section 32 of the coalescer assembly 22 is connected to the solvent tank 24 and the recovered oil storage tank 26 through an oil outlet line 42 having valves 44 and 46 therein which are operative for selectively controlling the flow of oil from the oil second stage section 32 into the solvent tank 24 and the recovered oil tank 26. A water outlet line 48 having a valve 50 therein connects the water second stage section 34 to the hydrocarbon sensor 28 and the water outlet line 48 is connected to the feed line 36 between the feed pump 20 and the mixer 21 through a water recycle line 52 having a valve 54 therein.

The skimmer 18 is preferably of conventional construction and it is operative for withdrawing a feed oil-water mixture from an oil spill on the surface of a body of water and for feeding it to the filter 19. The filter 19 preferably comprises a dual bypass filter comprising a pair of alternatively operative first and second screens for screening large debris from the feed oil-water mixture before it reaches the feed pump 20. The feed pump 20 preferably comprises a conventional centrifugal pump which is operative for drawing the feed oil-water mixture from the inlet line 35 and discharging it into the feed line 36 so that the feed oil-water mixture passes through the mixer 21 and into the coalescer assembly 22. The mixer 21 preferably comprises a conventional mixing vessel, although the use of various other conventional mixing apparatus, such as centrifugal pumps and the like is also contemplated. The mixer 21 is operative for mixing the feed oil-water mixture from the pump 20 with a solvent and/or a solvent oil mixture from either the solvent tank 24 or the recovered oil tank 26 in order to reduce the viscosity of the oil in the feed oil-water mixture in the inlet line 36 to a level below approximately 80 centipoise.

The solvent tank 24 preferably comprises a conventional storage tank and it must be at least partially filled with a suitable solvent having a viscosity of less than approximately 80 centipoise before commencing operation of the apparatus 10. The solvent from the solvent tank 24 is added to the feed oil-water mixture in the feed line 36 from the feed pump 20 by means of the pump 37 and the line 38 and the solvent is preferably added at a rate which is in excess of the amount required to reduce the level of the viscosity of the oil in the feed oil-water mixture to below approximately 80 centipoise. In this regard, it has been found that virtually any hydrophobic hydrocarbon solvent having a viscosity of less than approximately 80 centipoise can be effectively utilized for reducing the viscosity of the oil in the feed oil-water mixture. Obviously, however, the lower the viscosity of the solvent from the solvent tank 24, the smaller the quantity of solvent required to reduce the viscosity of the oil in the feed oil-water mixture to a level below approximately 80 centipoise. Various light solvents, such as benzene, cumene, hexane, heptane, octane, styrene, and toluene, as well as various gasoline or namptha streams can be effectively utilized as solvents for reducing the viscosity of the oil in the feed oil-water mixture. However, in order to minimize the fire hazard in many applications it may be preferable to utilize a lightly heavier hydrocarbon solvent, such as No. 2 fuel, diesel fuel or kerosene.

The recovered oil tank 26 preferably also comprises a conventional storage tank and it is preferably emptied before starting operation of the apparatus 10.

The coalescer 22 preferably comprises a conventional liquid-liquid coalescer of a type which is operative for separating an oil water mixture into discrete oil and water phases in order to produce separate substantially pure water and oil streams. The inlet first stage section 30 preferably comprises a horizontally oriented vessel containing a suitable coalescer mesh, such as a co-knit wire and fiberglass mesh. For example, it has been found that a 90 needle tubular co-knit mesh of wire and fiberglass such as manufactured by ACS Industries of Woonsocket, R.I. can be effectively utilized in the inlet first stage section 30 for initially or partially separating the oil-solvent mixture in the viscosity adjusted oil-water mixture from the water in the adjusted oil-water mixture. However, it will be understood that various other materials such as co-knit wire and teflon (Dupont TM), steel wool, polypropylene, PVDF, polyester or various other co-knit materials can also be effectively utilized in the inlet first stage section 30. In any event, the purpose of the inlet first stage section 30 is to separate the viscosity adjusted oil-water mixture into a discrete oil-solvent phase and a discrete water phase with a relatively well defined interface therebetween. The oil second stage section 32 and the water second stage section 34 are preferably defined by a single substantially vertically oriented vessel which is connected in substantially perpendicular relation to the inlet first stage section 30 in the manner illustrated so that the oil and water second stage sections 32 and 34, respectively, are in open communication with the inlet first stage section 30. The oil second stage section 32 preferably contains a rejection medium, such as a co-knit mesh of stainless steel and nylon or stainless steel and teflon (Dupont TM) mesh which is operative for collecting any water droplets carried into the oil second stage section 32 with the oil-solvent phase from the inlet first stage section 30. The water second stage section 34 preferably contains a rejection medium, such as a knitted polypropylene mesh which is operative for effectively collecting oil droplets entrained in the water phase from the inlet first stage section 30. As the water droplets in the oil second stage section 32 increase in size they fall downwardly into the water second stage section 34 and similarly as the oil droplets in the water second stage section 34 increase in size they rise upwardly into the oil second stage section 32. The rates at which these particles rise and fall can be determined by Stoke's Law as is well known to those skilled in the art. In any event, it has been found that the coalescer assembly 22 can be effectively utilized for separating the adjusted oil-water stream from the mixer 21 into a water stream containing less than approximately 10 PPM of hydrocarbons and an oil stream containing less than approximately 500 PPM water.

For operating the apparatus 10 in accordance with the method of the instant invention the solvent tank 24 is preferably first filled with a suitable solvent, such as No. 2 fuel. The boat 14 is then navigated on the surface of a body of water having an oil spill thereon to recover oil from the oil spill. The oil in the oil spill obviously must have a specific gravity which is less than that of the water in the body of water and it can have a viscosity in excess of 80 centipoise at the temperature of the water in the body of water. As the boat 14 is navigated on the body of water, the skimmer 18 is operated to draw a feed oil-water mixture from the surface of the body of water in a conventional manner. The method and apparatus of the instant invention can then be effectively operated to process the feed oil-water mixture regardless of the water to oil ratio therein. In this regard it has been found that in most cases water to oil ratios fall between ten to one and one hundred to one, although the method and apparatus can be effectively utilized regardless of the oil to water ratio. In any case, as the feed oil-water mixture is picked up by the skimmer 18, it is drawn through the filter 19 by the pump 20 and then fed to the mixer 21 and on to the coalescer assembly 22. As the feed oil-water mixture from the skimmer 18 leaves the pump 20, it is blended with solvent from the solvent tank 24 and the solvent is mixed with the oil in the feed oil-water mixture in the feed line 36 and in the mixer 21 to reduce the viscosity of the combined oil-solvent stream in the feed oil-water mixture to a level of below approximately 80 centipoise and preferably below approximately 60 centipoise. In this regard, it has been found that although it is possible to process oil-solvent-water mixture having viscosities of approximately 80 centipoise, processing ratios through the apparatus 10 can be increased significantly by reducing the viscosities of the oil-solvent mixtures processed in the apparatus 10 to levels below approximately 60 centipoise. Further, in the preferred method a substantially greater quantity of solvent is added to the feed oil-water mixture than is required to reduce the viscosity of the oil-solvent mixture from the mixer 21 to a level below approximately 80 centipoise or even 60 centipoise. In this connection, because the viscosity of the oil in various portions of an oil spill may vary significantly and because the ratio of water to oil in the feed oil-water mixture from the skimmer 18 may also vary significantly over a relatively short period of time, it is virtually impossible to control the viscosity of the oil in the adjusted oil-water mixture to a precise level. Therefore, it is generally preferable to add excess solvent to the feed oil-water mixture and to then continuously recycle a portion of the solvent-oil mixture from the coalescer assembly 22 into the feed oil-water mixture to reduce the viscosity of the oil in the adjusted oil-water mixture leaving the mixer 21 to a level below approximately 80 centipoise. In any event, as the adjusted oil-water mixture is passed through the coalescer assembly 22, the inlet first stage section 30, the oil second stage 32 and the water second oil stage section 34 are operative for continuously separating the oil-solvent mixture in the adjusted oil-water mixture from the water in the adjusted oil-water mixture to produce a substantially hydrocarbon free water outlet stream in the outlet line 48 and a substantially water free oil-solvent stream in the oil outlet line 42. The water in the water outlet line 48 is normally passed outwardly through the valve 50 and analyzed by the hydrocarbon analyzer 28 before returning it to the body of water from which it was taken in order to be sure that it does not contain an excess quantity of hydrocarbons. As long as the water in the water outlet line 48 is essentially pure, the valve 54 is normally left closed and the water from the water outlet line 48 is discharged directly back into the body of water. In the event that the hydrocarbon level in the water outlet line 48 reaches an unacceptable level, the valve 54 can be opened and the valve 50 closed so that the water is recycled through the coalescer assembly 22.

During the initial stages of operating the apparatus 10 in connection with an oil spill, the oil from the outlet line 42 is preferably discharged into the recovered oil storage tank 26. The apparatus 10 is normally operated with a solvent having a viscosity which is well below approximately 80 and the solvent is normally added at a rate which is well in excess of the rate required to reduce the viscosity of the hydrocarbon stream entering the coalescer assembly 22 to a level below approximately 80 centipoise. Assuming that the solvent tank 24 and the storage tank 26 are of approximately the same volume, after approximately half of the solvent has been removed from the solvent tank 24, the solvent pump 37 is deactuated and the recycle pump 39 is actuated so that the solvent-oil mixture from the storage tank 26 is recycled back into the feed line 36 to reduce the viscosity of the oil in the incoming feed oil-water mixture to a level below approximately 80 centipoise. This procedure is continued until either the recovered oil storage tank 26 is filled or the viscosity of the oil-solvent mixture in the recovered oil storage tank 26 approaches a convenient predetermined maximum level which is less than approximately 80 centipoise. As a result, while solvent from the solvent tank 24 is initially added at an excess rate to compensate for fluctuations in the amount of oil in the feed oil-water mixture as well as the viscosity of the oil in the feed oil-water mixture, the recovered oil-solvent mixture is recycled back into the feed line to again take advantage of the viscosity reducing properties of the solvent in the solvent-oil mixture. When either the viscosity of the solvent-oil mixture begins to approach the predetermined maximum level or the storage tank 24 is filled, the valve 46 is closed and the valve 44 is opened so that the solvent-oil mixture from the second stage oil coalescer 32 is discharged into the solvent tank 24, and the solvent pump 37 is again actuated so that the solvent from the solvent tank 24 is discharged into the feed line 36 to reduce the viscosity of the oil in the feed oil-water mixture from the pump 20. As this operation is continued, the concentration of the oil in the solvent tank 24 is gradually increased, and when either the viscosity of the solvent-oil mixture in the solvent tank 24 reaches a predetermined maximum level which is less than approximately 80 centipoise or the tank 24 becomes full, the apparatus 10 is shut down to unload the tanks 24 and 26 and to refill the solvent tank 24 with solvent.

Referring to FIG. 2, the apparatus 12 is illustrated. The apparatus 12 is substantially the same as the apparatus 10 and it includes a skimmer 18, a filter 19, an inlet pump 20, a mixer 21, a solvent tank 24, a recovered oil storage tank 26 and a hydrocarbon sensor 28 as well as the various pumps, lines, and valves hereinabove described with respect to the apparatus 10. However, in contrast to the apparatus 10, the apparatus 12 comprises a coalescer assembly generally indicated at 56 which functions in substantially the same manner as the coalescer assembly 22 but which includes three individual coalescer units, namely an inlet first stage coalescer unit 58, an oil second stage coalescer unit 60 and a water second stage coalescer unit 62 which are operative for separating an adjusted oil-water mixture into water and hydrocarbon phases in a manner similar to that hereinabove described with respect to the coalescer assembly 22.

The first stage coalescer unit 58 preferably comprises a horizontally disposed vessel containing a suitable coalescer mesh, such as a co-knit stainless steel wire and fiberglass mesh of the type hereinabove described in connection with the inlet first stage coalescer section 30. The inlet first stage unit 58 is preferably operative for separating the adjusted feed oil-water mixture from the mixer 21 into hydrocarbon and water phases having a substantially clean interface therebetween. The first stage coalescer unit 58 is connected to the oil second stage coalescer unit 60 through an oil-solvent line 64 and it is connected to the water second stage coalescer unit 62 through a water line 66. The first stage coalescer unit 58 preferably includes a suitable conventional interface control which is operative for controlling the flow of water and/or solvent-oil mixture through the lines 64 and/or 66, respectively, in order to maintain the interface between the oil-solvent phase and the water phase in the inlet coalescer unit 58 at a desired level.

The oil second stage coalescer unit 60 preferably comprises a substantially horizontally disposed vessel containing a suitable rejection medium, such as a co-knit stainless steel and nylon mesh and it is operative for separating out any remaining water droplets in the oil-solvent stream from the first stage coalescer unit 58. The oil-solvent line 64 is connected to the bottom end of the oil second stage coalescer unit 60 so that the oil-solvent mixture from the inlet first stage coalescer unit 58 passes upwardly through the coalescer medium in the oil second stage unit 60 and any water collected in the bottom of the oil second stage coalescer unit 60 is fed into the top of the water second stage coalescer unit 62 through a line 68. The recovered oil line 42 is connected to the top of the oil second stage coalescer unit 60 so that the recovered oil-solvent mixture can be discharged into either the solvent storage tank 24 or the recovered oil storage tank 26. The oil second stage coalescer unit 60 can also include an interface control for controlling the level of the interface between the hydrocarbon and water phases therein, although in most instances the quantity of water entering the oil second stage coalescer unit 60 is so small that the level of the water phase in the oil second stage coalescer unit 60 can be controlled manually.

The water second stage coalescer unit 62 preferably also includes a substantially horizontally disposed vessel containing a suitable coalescer medium, such as a co-knit stainless steel wire and polypropylene mesh. The water second stage coalescer unit 62 is operative for separating out any hydrocarbon droplets in the water stream from the first stage coalescer unit 58. The water stream from the first stage coalescer unit 58 enters the top of the water second stage coalescer unit 62 and the water outlet line 48 is connected to the bottom of the water second stage coalescer unit 62. A hydrocarbon line 70 extends from the top of the water second stage coalescer unit 62 to the bottom of the oil second stage coalescer unit 60 for feeding any oil-solvent mixture collected in the later second stage coalescer unit 62 to the bottom of the oil second stage coalescer unit 60. Although the water second stage coalescer unit 62 can also include an interface control for controlling the level of the interface therein, in most instances the amount of oil-solvent mixture carried over with the water from the inlet first stage coalescer unit 58 is so small that it can be controlled manually.

The apparatus 12 is adapted to be operated in a manner which is identical to that hereinabove described with respect to the apparatus 10 and it can be effectively utilized for separating the oil in a feed oil-water mixture from an oil spill from the water in the feed oil-water mixture. However, because the apparatus 12 contains three separate coalescer units, in some instances it is more practical for mounting and use on a boat, such as a barge or a skimmer boat. In this connection, because the apparatus 12 includes three separate coalescer units, the entire apparatus 12 can be more effectively mounted at a relatively low elevation on a boat so that it does not adversely effect the center of gravity of the boat to any significant extent.

EXAMPLE

In a specific application of the method of the instant invention a pilot apparatus of the type illustrated in FIG. 1 was operated to recover crude oil from the surface of a salt water pond. The test pond was approximately three and one half feet in diameter and it contained approximately 45 gallons of salt water. At the beginning of the test a one gallon sample of heavy Alaskan crude oil was poured onto the surface of the pond. In this regard, although the crude oil tested was similar to that spilled onto Prince William Sound by the Exxon Valdez in March of 1989, the test sample had previously been allowed to weather for several days. Hence, the actual test sample more closely resembled heavy Alaskan crude from the Exxon Valdez several days after the spill occurred. The crude oil as tested had a specific gravity of 0.946 and a viscosity of 650 centipoise at 70° F. and the process was carried out utilizing a kerosene solvent having a viscosity of 2.6 centipoise and a specific gravity of 0.792 at 70° F. The coalescer assembly of the pilot apparatus included an inlet first stage section which was two inches in diameter and twenty four inches long and contained a co-knit fiberglass and stainless wire mesh. The coalescer assembly also included a water second stage section which was three inches in diameter and twenty four inches long and contained a co-knit monofilament polypropylene and stainless steel wire mesh and an oil second stage section which was three inches in diameter and twenty four inches long and contained a co-knit multi-filament nylon and stainless steel wire mesh. The unit was initially operated with an oil-water feed rate of approximately 0.6 GPM and solvent from a solvent storage tank was injected at a rate which varied from between 0.1 GPM to 0.2 GPM. The feed oil-water mixture initially contained 5% oil, although the percentage of oil in the feed oil-water mixture varied throughout the operation. It was found that when the unit was operated in this manner, the inlet first stage coalescer section was operative for separating the adjusted oil-water mixture into discrete hydrocarbon and water phases and that the oil and water second stage coalescer sections were operative for further purifying the hydrocarbon and water phases so that an essentially hydrocarbon free water stream was discharged from the water second stage section and an essentially water free oil-solvent stream was discharged from the oil second stage section. The water from the water second stage section was returned directly to the pond throughout the test. The hydrocarbon stream from the oil second stage section was discharged into the solvent storage tank and as a result after operating for a short period of time it was possible to visually detect that the solvent stream injected into the feed oil-water mixture contained recycled crude oil. As the solvent-oil mixture from the solvent storage tank was continually recycled into the feed oil-water mixture, the viscosity of the solvent-oil mixture and the level in the solvent tank gradually increased due to the volume of the recovered crude oil in the solvent storage tank. After approximately three hours of operation virtually all of the oil had been recovered from the surface of the pool and the viscosity of the solvent-oil mixture in the solvent storage tank had increased to approximately 30 centipoise. The water returned to the pond was analyzed at several times during the test and was found to contain between four and seven PPM of hydrocarbons. The water appeared to be clear and virtually pure. The oil-solvent mixture in the solvent storage tank was tested and found to contain 280 PPM of water which was actually less than the amount of water contained in the original crude oil. As a result, it was concluded that the process had effectively recovered substantially all of the oil from the test pond and that despite the high viscosity of the crude oil which had initially been poured onto the surface of the test pond the coalescer assembly had effectively separated the adjusted oil-water mixture into an essentially water free oil-solvent stream and an essentially hydrocarbon free water stream.

It is seen therefore that the instant invention provides a highly effective method and apparatus for recovering oil from an oil spill. The method can be effectively utilized for recovering a high viscosity oil from an oil spill by adding a solvent to the oil and thereafter processing the oil through an oil-water coalescer so that the water recovered with the oil can be immediately returned to the body of water and so that the oil can be practically stored on a recovery boat. Further, by initially adding an excess amount of solvent to the feed oil-water mixture before it is processed in a coalescer and thereafter recycling the recovered oil-solvent mixture, the method can effectively compensate for large variations in the viscosity of the oil in the oil-water mixture as well as large variations of the concentration of the oil in the oil-water mixture to enable an oil-water mixture from an oil spill to be effectively processed in an continuous operation while maximizing the viscosity reducing effects of the solvent. Both the apparatus 10 and the apparatus 12 can be effectively utilized for carrying out the method of the instant invention and they can be readily adapted to be installed on board various boats, barges or the like. Further, the apparatus 10 and 12 can be effectively utilized for processing oil-water mixtures containing oils having viscosities of less than 80 centipoise without adjusting the viscosities of the oils. Accordingly, it is seen that the instant invention represents a major breakthrough in the art relating to oil recovery apparatus and that it therefore has substantial merit in terms of its benefit to the ecology.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A method of recovering a hydrophobic hydrocarbon oil from the surface of a body of water, said body of water having a water temperature, said oil having a specific gravity which is less than the specific gravity of the water in said body of water and a viscosity which is greater than approximately 80 centipoise at said water temperature, said method comprising the steps of:
   a. continuously withdrawing a feed oil-water mixture from the surface of said body of water;
   b. continuously adjusting the viscosity of the oil in said feed oil-water mixture to a level below approximately 80 centipoise to form an adjusted oil-water mixture; and
   c. continuously passing said adjusted oil-water mixture through an oil-water coalescer to separate the oil in said adjusted oil-water mixture from the water in said adjusted oil-water mixture.

2. In the method of claim 1, said adjusting step comprising continuously adding a hydrophobic hydrocarbon solvent to at least a portion of said feed oil-water mixture to form said adjusted oil-water mixture, said solvent having a viscosity of less than approximately 80 centipoise at said water temperature and a specific gravity which is less than the specific gravity of the water in said feed oil-water mixture, said solvent being added at a rate sufficient to reduce the viscosity of the oil in said portion of said feed oil-water mixture to below approximately 80 centipoise, said continuously passing step further characterized as continuously passing said adjusted oil-water mixture through an oil-water coalescer to separate the oil and solvent in said adjusted oil-water mixture from the water in said adjusted oil-water mixture.

3. In the method of claim 2, said adjusting step comprising adjusting the viscosity of said feed oil-water mixture to a level below approximately 60 centipoise at said water temperature, said solvent having a viscosity of less than approximately 60 centipoise at said water temperature.

4. In the method of claim 2, said withdrawing step comprising continuously withdrawing a feed oil-water mixture from the surface of said body of water at a feed rate, said adjusting step comprising adding said solvent into said feed oil-water mixture for a first period of time at a rate which is in excess of the rate of said solvent required to reduce the viscosity of the oil in said feed oil-water mixture to below approximately 80 centipoise, said method further comprising the steps of feeding the oil and solvent from said coalescer into a recycle vessel until said recycle vessel contains a volume of said oil and solvent which is at least approximately 30% of the volume of said feed oil-water mixture withdrawn from the surface of said body of water at said feed rate during a one (1) minute time period, and thereafter continuously adding a stream comprising oil and solvent from said recycle vessel into said feed oil-water mixture for a second period of time at a rate which is sufficient to reduce the viscosity of the oil in said feed oil-water mixture to below approximately 80 centipoise, said stream from said recycle vessel having a viscosity which is less than approximately 80 centipoise, said second period of time being less than the period of time required to raise the level of the viscosity of the oil and solvent in said recycle vessel to approximately 80 centipoise.

5. In the method of claim 2, said solvent comprising a petroleum distillate solvent.

6. The method of claim 2 further comprising the step of returning the water from said oil-water coalescer to said body of water.

7. In the method of claim 2, said hydrophobic hydrocarbon oil comprising a crude oil residue from a crude oil spill on the surface of said body of water.

8. A method of recovering a hydrophobic hydrocarbon oil from the surface of a body of water, said body of water having a water temperature, said oil having a specific gravity at said water temperature which is less than the specific gravity of the water in said body of water at said water temperature and a viscosity which is greater then approximately 80 centipoise at said water temperature, said method comprising the steps of:
   a. continuously drawing a feed oil-water mixture from the surface of said body of water onto a recovery boat navigating on the surface of said body of water;
   b. continuously adding a hydrophobic hydrocarbon solvent having a viscosity of less than 80 centipoise at said water temperature and a specific gravity which is less than the specific gravity of the water in said body of water to at least a portion of said feed oil-water mixture to form an adjusted oil-water mixture, said hydrocarbon solvent being withdrawn from a solvent storage vessel on said recovery boat and being added to said feed oil-water mixture on said boat at a rate sufficient to reduce the viscosity of the oil in said portion of said feed oil-water mixture to a level below approximately 80 centipoise;
   c. continuously passing said adjusted oil-water mixture through an oil-water coalescer to separate the oil and solvent in said adjusted oil-water mixture from the water in said adjusted oil-water mixture;
   d. storing the oil and solvent separated from said adjusted oil-water mixture on said boat; and
   e. returning the water separated from said adjusted oil-water mixture to said body of water.

9. In the method of claim 8, said drawing step comprising continuously drawing a feed oil-water mixture from the surface of said body of water at a feed rate, said adjusting step comprising adding said solvent to said portion of said feed oil-water mixture for a first period of time at a rate which is in excess of the rate required to reduce the viscosity of the oil in said portion of said feed oil-water mixture to below approximately 80 centipoise, said storing step further characterized as storing a quantity of the oil and solvent from said coalescer in a recycle vessel on said boat until said recycle vessel contains a quantity of oil and solvent equal to at least approximately 30% of the volume of said portion of said feed oil-water mixture at said feed rate during a one (1) minute time period, said adjusting step further comprising the step of after said first period of time continuously adding a stream comprising said oil and solvent from said recycle vessel into said portion of said feed oil-water mixture, said stream from said recycle vessel having a viscosity which is less then approximately 80 centipoise and being added for a second period of time at a rate which is sufficient to reduce the viscosity of the oil in said portion of said feed oil-water mixture to below approximately 80 centipoise, said second period of time being less than the period of time required to raise the viscosity of the oil and solvent in said recycle vessel to above approximately 80 centipoise.

10. In the method of claim 9, said solvent comprising a petroleum distillate.

11. In the method of claim 8, said hydrophobic hydrocarbon oil comprising a crude oil residue from a crude oil spill on the surface of said body of water.

12. An apparatus for recovering a hydrophobic hydrocarbon oil from the surface of a body of water, said body of water having a water temperature, said oil having a specific gravity which is less than the specific gravity of the water in said body of water and a viscosity which is greater than approximately 80 centipoise at said water temperature, said apparatus comprising:
   a. means for continuously withdrawing a feed oil-water mixture from the surface of said body of water;
   b. means for continuously adjusting the viscosity of the oil in said feed oil-water mixture to a level below approximately 80 centipoise to form an adjusted oil-water mixture; and
   c. oil-water coalescer means for continuously separating the oil in said adjusted oil-water mixture from the water in said adjusted oil-water mixture.

13. In the apparatus of claim 12, said means for adjusting comprising means for adding a hydrophobic hydrocarbon solvent to said feed oil-water mixture, said solvent having a viscosity of less than approximately 80 centipoise at said water temperature and a specific gravity which is less than the specific gravity of the water in said body of water at said water temperature, said means for adding said solvent being operative for adding said solvent at a rate sufficient to reduce the viscosity of the oil in said feed oil-water mixture to below approximately 80 centipoise.

14. In the apparatus of claim 12, said means for adding solvent being operative for adding solvent at a rate which is in excess of the rate required to reduce the viscosity of the oil in said feed oil-water mixture to below approximately 80 centipoise, said apparatus further comprising tank means for receiving and accumulating a volume of oil and solvent from said coalescer means equal to at least 30% of the volume of the oil and water in said feed oil-water mixture withdrawn from the surface of said body of water during a one (1) minute time period, and recycle means for recycling oil and solvent from said tank means into said feed oil-water mixture in order to reduce the viscosity thereof to a level below approximately 80 centipoise.

15. The apparatus of claim 14 in combination with a boat navigable on the surface of said body of water, said means for withdrawing a feed oil-water mixture, said viscosity adjusting means, said coalescer means, said tank means and said recycle means being mounted on said boat.

16. In the apparatus of claim 12, said coalescer means comprising an inlet first stage, an oil second stage and a water second stage, said adjusted oil-water mixture being fed to said inlet first stage, said inlet first stage being operative for separating said adjusted oil-water mixture into an intermediate oil phase and an intermediate water phase, said intermediate oil phase consisting essentially of oil but including a relatively small percentage of water, said intermediate water phase consisting essentially of water but including a relatively small percentage of oil, said oil second stage being operative for receiving said intermediate oil phase from said inlet first stage and passing water from said intermediate oil phase to said water second stage, said water second stage receiving said intermediate water phase from said inlet first stage and passing oil from said intermediate water phase to said oil second stage.

17. The apparatus of claim 12 in combination with a boat navigable on the surface of said body of water, said means for withdrawing a feed oil-water mixture, said viscosity adjusting means and said coalescer means being mounted on said boat, said apparatus further comprising storage tank means on said boat for storing oil from said coalescer means and means for returning the water from said coalescer means to said body of water.

18. A method of recovering a hydrophobic hydrocarbon oil from the surface of a body of water, said body of water having a water temperature, said oil having a specific gravity which is less than the specific gravity of the water in said body of water and a viscosity which is greater than approximately 80 centipoise at said water temperature, said method comprising the steps of:
   a. continuously withdrawing a feed mixture comprising said oil and water from the surface of said body of water;
   b. continuously adding a solvent mixture of said oil and a hydrophobic hydrocarbon solvent to at least a portion of said feed mixture to form an adjusted mixture, said solvent mixture having a viscosity of less than approximately 80 centipoise at said water temperature and a specific gravity which is less than the specific gravity of the water in said feed mixture, said solvent mixture being added at a rate sufficient to reduce the viscosity of the oil in said portion of said feed mixture to below approximately 80 centipoise; and
   c. continuously passing said adjusted mixture through an oil-water coalescer to separate the oil and solvent in said adjusted mixture from the water in said adjusted mixture.

19. In the method of claim 18, said withdrawing step comprising continuously withdrawing a feed mixture from the surface of said body of water at a feed rate, said adjusting step comprising adding said solvent mixture into said feed mixture at a rate which is in excess of the rate of said solvent mixture required to reduce the viscosity of the oil in said feed mixture to below approximately 80 centipoise, said solvent mixture being withdrawn from a recycle vessel containing a volume of said oil and solvent which is at least approximately 30% of the volume of said feed mixture withdrawn from the surface of said body of water at said feed rate during a one (1) minute time period, the oil and solvent from said oil water coalescer being added to said recycle vessel, said solvent mixture being withdrawn from said recycle vessel for a period of time which is less than the period of time required to raise the level of the viscosity of the oil and solvent in said recycle vessel to approximately 80 centipoise.

* * * * *